Patented June 10, 1947

2,421,985

UNITED STATES PATENT OFFICE 2,421,985

PREPARATION OF CLARIFIED SUGAR SOLUTIONS FOR FERMENTATION, ETC.

Robert M. Boehm, Laurel, Miss., Horace E. Hall, Lyle, Tenn., and Joseph A. MacDonald, Rutherford, N. J., assignors to Masonite Corporation, Laurel, Miss., a corporation of Delaware No Drawing. Application March 31, 1944, Serial No. 529,035

7 Claims. (Cl. 195—84)

This invention relates to a process for the preparation of sugar solutions in such clarified state that they are well adapted for fermentation or like treatment to produce organic compounds such as acetone, butyl alcohol, acetic acid and the like. It relates more especially to the preparation of such sugar solutions from liquors derived from wood or woody materials, hereinafter called wood liquors. The practice of the process will be described upon wood liquors obtained by expression or washing from fiber, which fiber was produced by subjecting wood chips in a gun, such as described in U. S. Patent 1,824,221 to Mason, to the hydrolyzing action of high-pressure steam, followed by explosive discharge from the gun. Such a liquor is described in U. S. Patent No. 2,224,135 to Boehm.

When sugar solutions for fermentation are prepared from such wood liquor by previously-known procedure, difficulties are encountered in the fermentation treatment thereof by the fermenting organisms being apparently poisoned by toxic compounds which are present.

It is an object of this invention to provide a process of treating wood liquors to prepare sugar solutions for fermentation by which materials toxic to fermentation are removed and the inhibition of fermentation is avoided.

A further object consists in the provision of such a process wherein a sulfide precipitation is made use of to remove materials toxic to fermentation.

The wood liquor obtained as described contains hemicellulosic materials made soluble in water by the high-pressure steam treatment. From these materials hexose and pentose sugars may be formed, and such precursors of hexose and pentose are herein referred to as hexosans and pentosans. The liquor also contains other organic materials such as soluble or dispersed tars, acetic acid, formic acid, soluble or dispersed lignin or lignin-degradation products, astringents, and various other materials, some or all of which, and especially the astringents, must be removed before sugar solutions will be obtained in condition for fermentation and the like treatment.

The presence of dispersed or colloidal material in such liquor makes extraction treatment with water-immiscible solvents, for removal of tars, organic acids and the like, difficult or impossible due to tendency toward emulsification.

The liquor is first subjected to mild hydrolysis to convert the hexosans and pentosans to sugars, as for example by cooking for about thirty to forty minutes with steam at a pressure of about 20 pounds per square inch, with addition of acid catalytic material consisting of preferably about 1% of $H_2SO_4$ by weight of the liquor, which acid, together with the acids in the liquor, brings about precipitation of the dispersed or colloidal matter, and also effects the conversion of hexose and pentose precursors to hexose and pentose sugars. The mild conditions of hydrolysis avoid substantial degradation of the sugars and prevent undue formation of additional tars or of furfural, both of which are toxic to fermentation.

In order to collect and remove as much as possible of the tars which ordinarily are present or formed to some extent during the mild hydrolysis treatment, finely divided material may be added to the liquor prior to hydrolysis. Various clays and the like may be used for this purpose. The preferred fine material, however, consists of so-called sludge, or very fine solid particles of wood fiber, etc., contained in and obtainable from the waste materials from fiberboard manufacturing processes. Such sludge material is described in U. S. Patent 2,080,077 to Howard et al.

The precipitated material, together with any added sludge or other finely divided material, is removed from the liquor by filtering. The liquor is thus put into satisfactory conditon for extraction by water-immiscible solvents.

The filtrate thus secured is preferably subjected to solvent extraction for removal of tars, organic acids, traces of furfural, and the like. Preferred solvents found suitable for this purpose are butyl alcohol or furfural although other suitable water-immiscible solvents or mixtures of solvents, such as ethyl acetate-isopropyl ether may be used.

Solvent extraction is preferably carried out by counter-current washing with the solvent in a liquid-liquid extractor, and the solvent is recovered for re-use after removal and recovery of dissolved materials such as tars, acetic acid, furfural and the like. Solvents remaining dissolved in the treated liquor are desirably removed in a stripping column by means of steam and recovered for re-use in the customary manner.

The extraction and stripping treatments are preferably supplemented by treatment with activated carbon. Such treatment may be carried out by adding activated carbon in subdivided state to the liquor, followed by filtering out the carbon and adsorbed material. Used in this way, the carbon can be cleaned and re-used, if desired. If desired, this treatment with carbon can be performed in whole or in part at a latter period.

At this stage the liquor is acidic, having for example a pH of about 3 to 4 due to the presence of the acid, such as $H_2SO_4$, used for catalyzing the hydrolysis treatment. It also contains materials which are toxic to fermentation, and which may include tannins or other materials that are apparently of astringent character, as indicated by a bitter or puckery taste. Such toxic materials will be referred to as astringents. If fermentation of the liquor is attempted at this stage, satisfactory results are not obtained apparently due to presence of toxic materials, especially astringents.

According to the present invention, such liquors are clarified and prepared for fermentation by supplying the acid liquor with calcium and sulfide ions in suitable form, as by adding thereto either lime and calcium sulfide, or calcium sulfide alone, or lime and hydrogen sulfide. In the treatment the acid liquor is brought to a hydrogen ion concentration which may equal or approach the neutral point, although in general it is not found necessary to bring the hydrogen ion concentration to a pH above about 7. In general it is sufficient to bring the hydrogen ion concentration to a pH of about 5.5 to 6.5 in the process. By then filtering out the precipitate which is formed, a fermentable filtrate free from bitter or puckery taste is obtained, indicative of the removal of materials which are toxic to fermentation. By drying the precipitate and heating with carbon, calcium sulfide can be obtained from the calcium sulfate, and this calcium sulfide can be re-used in the process.

The following are some procedures which have been employed in carrying out the invention:

(1) The acid liquor, produced as above described, was treated with lime sufficient to bring it to a pH of 6 to 6.5, and filtered. Hydrogen sulfide was then passed through the filtrate until no further precipitation occurred, at which time the pH was found to be about 5.5. The liquor was again filtered. The filtrate was then acidified with sulfuric acid to a pH of about 4.5, diluted and subjected to a butyl alcohol fermentation in the customary manner.

(2) The acid liquor was treated with lime sufficient to bring it to a pH of 3.8 to 4.5. After filtering, sufficient calcium sulfide was added to the filtrate to bring its pH to 5.5 to 6.5 and the further precipitate was filtered off. The filtrate was then acidified and subjected to fermentation as above described.

(3) The acid liquor was treated with calcium sulfide sufficient to bring its pH to 6 to 6.5 and filtered. The filtrate was then acidified and subjected to fermentation as above described.

In each case the fermentation was found to proceed with greater vigor and with greater yields of butyl and ethyl alcohols than in the case of liquors which had not been subjected to the aforesaid treatments. Similar marked improvement was found in connection with other types of fermentation with other bacteria, yeasts, and molds.

Although the present invention has been described in connection with the use of lime and calcium sulfide to supply the calcium ions, and of calcium sulfide and hydrogen sulfide to supply the sulfide ions, other suitable compounds may be employed. For example, calcium acetate or other soluble calcium salt may be used to supply the calcium ions, and sodium sulfide or ammonium sulfide or other alkaline sulfide may be employed therewith to supply the sulfide ions and to reduce the acidity of the liquor, to thereby precipitate the constituents thereof that are toxic to or inhibit fermentation.

We claim:

1. The process of clarifying wood liquors for fermentation, which comprises subjecting the liquor to acid hydrolysis, washing the liquor with a substantially water-immiscible organic solvent containing a compound chosen from the group consisting of butyl alcohol, furfural and isopropyl ether which removes soluble components, heating the liquor to remove excess organic solvent, introducing calcium ions and sulfide ions into the liquor in sufficient quantity to raise the pH to about 7 which precipitates astringent materials toxic to fermentation, and separating the precipitate from the clarified liquor.

2. The process of clarifying wood liquors for fermentation, which comprises subjecting the liquor to acid hydrolysis, washing the liquor with a substantially water-immiscible organic solvent containing a compound chosen from the group consisting of butyl alcohol, furfural and isopropyl ether which removes soluble components, heating the liquor to remove excess organic solvent, admixing activated carbon with the liquor and filtering out the carbon, substantially neutralizing the liquor with lime, subjecting the liquor to the action of hydrogen sulfide to precipitate astringent materials toxic to fermentation, and separating the precipitate from the clarified liquor.

3. The process of clarifying wood liquors for fermentation, which comprises subjecting the liquor to acid hydrolysis, washing the liquor with a substantially water-immiscible organic solvent containing a compound chosen from the group consisting of butyl alcohol, furfural and isopropyl ether which removes soluble components, heating the liquor to remove excess organic solvent, substantially neutralizing the liquor with lime, treating the liquor with calcium sulfide to precipitate astringent materials toxic to fermentation, and separating the precipitate from the clarified liquor.

4. The process of clarifying wood liquors for fermentation, which comprises subjecting the liquor to acid hydrolysis, washing the liquor with a substantially water-immiscible organic solvent containing a compound chosen from the group consisting of butyl alcohol, furfural and isopropyl ether which removes soluble components, heating the liquor to remove excess organic solvent, substantially neutralizing the liquor with calcium sulfide to precipitate astringent materials toxic to fermentation, and separating the precipitate from the clarified liquor.

5. The process of treating wood liquor containing pentosans and hexosans to remove materials therefrom which are toxic to fermentation, which comprises subjecting the liquor to hydrolysis in the presence of a mineral acid to form pentose and hexose sugars, washing the liquor with a substantially water-immiscible organic solvent containing a compound chosen from the group consisting of butyl alcohol, furfural and isopropyl ether which removes soluble components, heating the liquor to remove excess organic solvent, introducing calcium ions and sulfide ions into the liquor in sufficient quantity to raise the pH to about 7 which precipitates astringent materials toxic to fermentation, and separating the precipitate from the sugar liquor.

6. The process of treating wood liquors containing pentosans and hexosans to remove materials therefrom which are toxic to fermentation, which comprises subjecting the liquor to hydrolysis in the presence of a mineral acid to form pentose and hexose sugars, washing the liquor with a substantially water-immiscible organic solvent containing a compound chosen from the group consisting of butyl alcohol, furfural and isopropyl ether which removes soluble components, heating the liquor to remove excess organic solvent, substantially neutralizing the liquor with lime, subjecting the liquor to the action of hydrogen sulfide to precipitate materials toxic to fermentation, and separating the precipitated materials from the sugar liquor.

7. The process of treating wood liquors containing pentosans and hexosans to remove materials therefrom which are toxic to fermentation, which comprises subjecting the liquor to hydrolysis in the presence of a mineral acid to form pentose and hexose sugars, washing the liquor with a substantially water-immiscible organic solvent containing a compound chosen from the group consisting of butyl alcohol, furfural and isopropyl ether which removes soluble components, heating the liquor to remove excess organic solvent, substantially neutralizing the liquor with lime, treating the liquor with calcium sulfide to precipitate materials toxic to fermentation, and separating the precipitated materials from the sugar liquor.

ROBERT M. BOEHM.
HORACE E. HALL.
JOSEPH A. MacDONALD.

REFERENCES CITED

UNITED STATES PATENTS

The following references are of record in the file of this patent:

| Number | Name | Date |
|---|---|---|
| 1,832,375 | Franck | Nov. 17, 1931 |
| 2,284,500 | Worth | May 26, 1942 |
| 2,203,360 | Partansky | June 4, 1940 |

OTHER REFERENCES

Synthetic Organic Chemicals—Carbide & Carbon (10th edit.).